Feb. 24, 1942.    J. C. McCUNE    2,273,972
CONTROL DEVICE
Filed Nov. 22, 1940
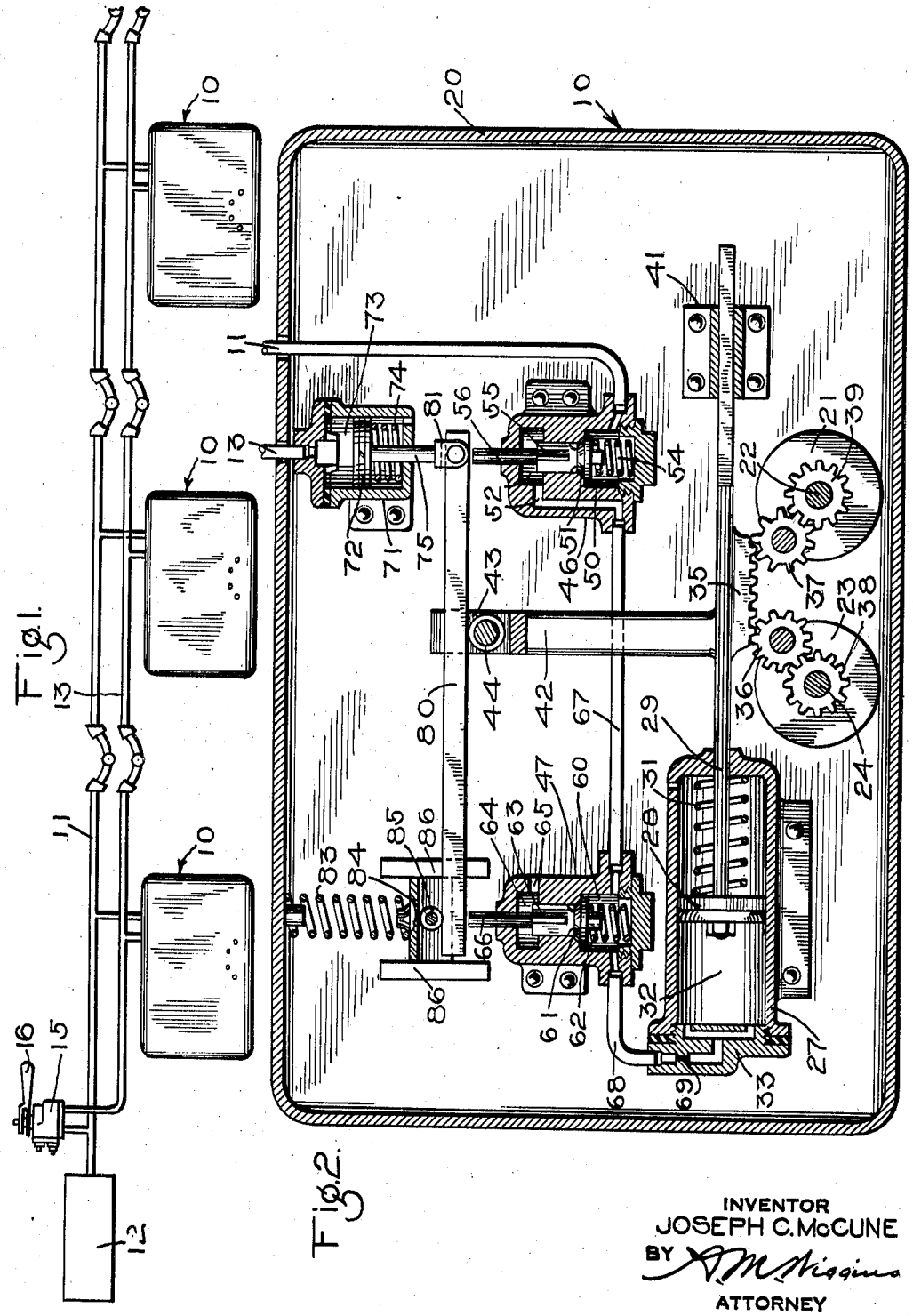
INVENTOR
JOSEPH C. McCUNE
BY [signature]
ATTORNEY Patented Feb. 24, 1942

2,273,972

UNITED STATES PATENT OFFICE 2,273,972

CONTROL DEVICE

Joseph C. McCune, Edgewood, Pa., assignor to The Westinghouse Air Brake Company, Wilmerding, Pa., a corporation of Pennsylvania Application November 22, 1940, Serial No. 366,608

5 Claims. (Cl. 192—2)

This invention relates to railway vehicle controlling equipments, and more particularly to a fluid pressure responsive apparatus for controlling both propulsion and braking of a vehicle.

In order to provide adequate transit service in large metropolitan areas, it has been proposed to operate trains made up of vehicles each of which is equipped with independent braking and propulsion control apparatus, together with means whereby such vehicles are adapted to be operated simultaneously by a motorman stationed in the leading vehicle. To insure ease of operation of the train of vehicles so equipped, it is desirable to provide means on each vehicle which is operative to actuate both the associated brake controlling means and the propulsion controlling means in exactly similar increments or steps, with respect to the similar apparatus on each of the other vehicles, as determined by variations in the pressure of fluid in a control pipe extending throughout the train. A brake and propulsion control actuator designed to provide the features just mentioned is disclosed and broadly claimed in the United States Patent No. 2,215,355 issued May 9, 1940, to Ellis E. Hewitt, which has been assigned to the assignee of the present application.

The principal object of this invention is to provide an improved propulsion and braking control actuator device which may be employed in a train system of the above type and which comprises fluid pressure operated means adapted for association with brake and propulsion controllers of any suitable design, the actuator device being operable to provide definite mechanical movements thereof in response to variations in pressure of fluid in a control pipe.

Other objects and advantages of the invention will be apparent in the following description thereof, taken in conjunction with the accompanying drawing, in which Fig. 1 is a schematic view of a brake and propulsion control system for a plurality of vehicles, the system including actuator devices constructed in accordance with the invention; and Fig. 2 is a diagrammatic sectional view illustrating in enlarged detail a single brake and propulsion control actuator of the type shown in Fig. 1.

As shown in Fig. 1, a train control system embodying my invention may comprise a plurality of brake and propulsion actuator devices 10, each of which is mounted on one of the vehicles in the train in operative association with the usual brake controller and propulsion controller thereof, a supply pipe 11 extending throughout the train and connected with a reservoir 12 carried on the leading vehicle, and a control pipe 13, which also extends throughout the train and is normally charged with fluid at a predetermined pressure that may be increased or decreased at will by operation of a motorman's control valve device 15. The control valve device 15 may be of any suitable construction, and is preferably of the self-lapping type operable to maintain a fluid pressure in the control pipe 11 corresponding with the position of a handle 16. As is hereinafter more fully explained, the control valve device is adapted to be operated to increase the pressure of fluid in the control pipe above the normal pressure when it is desired to effect propulsion of the train, and to effect reduction in the control pipe pressure when it is desired to cause an application of the brakes.

Referring to Fig. 2, the control equipment adapted to be carried by each vehicle includes the actuator device 10, the various elements of which may be mounted within a housing 20, a rotary propulsion controller 21, which has an operating shaft 22 extending through a suitable aperture in the housing 20, and a rotary brake controller mechanism 23, the operating shaft 24 of which likewise extends through an aperture formed in the housing.

The propulsion controller mechanism 21, which is not illustrated in detail in the drawing, may be of any desired type comprising a suitable circuit controlling mechanism operative to regulate the operation of the usual propulsion motors of the vehicle in accordance with the turning of the operating shaft 22. The brake controller mechanism 23 will be understood to be operative to control application and release of the usual vehicle brakes in accordance with movement of the rotary shaft 24, and may, for example, be constructed somewhat similarly to that shown in my United States Patent 2,112,423, issued on March 29, 1938.

Mounted within the housing 20 is an operating cylinder 27, in which is slidably mounted a piston 28 having a piston rod 29 extending outwardly of the cylinder. The piston 28 is subject on one side to the pressure exerted by a coil spring 31, one end of which bears against an inner wall of the cylinder 27, and which spring is under operating conditions opposed by the pressure of fluid in a chamber 32 formed at the opposite side of the piston and closed by a cylinder head 33 that is secured to the cylinder 27. The portion of the piston rod 29 extending outwardly of the cylinder 27 has formed thereon a rack portion 35, which, with the piston rod disposed in the normal or coasting position as shown in the drawing and hereinafter explained, is maintained in operative alignment with a pinion 36 associated with the brake controller device 23 and with a pinion 37 that is associated with the propulsion controller device 21.

The pinion 36 is mounted on a shaft that is suitably journaled in the housing 20, and is operatively engaged with a gear 38 that is keyed or otherwise secured to the brake operating shaft 24. The pinion 37 is similarly mounted in engagement with a gear 39 carried by the propulsion controller shaft 22. It will be observed that the rack portion 35 of the piston rod 29 is so arranged that upon movement to the left from the normal coasting position, the teeth formed thereon will operatively engage the teeth of the pinion 36, while upon movement of the rack portion from its coasting position to the right, it will effect operation of the pinion 37.

The end of the piston rod 29 opposite that extending into the cylinder 27 is preferably formed as square in cross-section, and is slidably guided in a suitable channel formed in a guide member 41 that is secured to the housing 20. The piston rod is thereby prevented from accidental rotation out of the position in which it is shown. Extending from the upper surface of the piston rod 29 adjacent the rack portion 35 thereof is a vertically disposed post 42, which carries at the upper end thereof a clevis portion 43 in which is journaled a roller 44, the purpose of which will hereinafter be explained.

For controlling the supply and release of fluid under pressure to and from the piston chamber 32 there are provided a supply valve assembly 46 and a release valve assembly 47, which assemblies are separately mounted in suitable casing structures carried by the housing 20 of the actuator assembly. Formed in the casing of the supply valve assembly 46 is a valve chamber 50 which communicates with the supply pipe 11 and has mounted therein a supply valve element 51 which is arranged to control communication from the valve chamber to a chamber and passage 52 formed in the casing. The valve member 51 is normally urged into seated position as shown in the drawing under the force of a spring 54 interposed between the valve member and the end wall of the valve chamber 50. A fluted guide stem 55 is carried by the valve member 51 and terminates in a plunger 56 which is slidably mounted in a suitable bore formed in the casing. Suitable packing means, not shown, may be provided for preventing leakage of fluid under pressure from the chamber 52 past the plunger 56.

The release valve assembly 47 comprises a casing having a valve chamber 60 which contains a release valve element 61 that is normally urged into seated position under the force exerted by coil spring 62 disposed in the chamber. The valve element 61 is provided with a fluted stem 63 extending through a suitable bore and into a chamber 64, which communicates with the atmosphere by way of a passage 65. A plunger 66 is carried by the fluted stem 63 and extends outwardly of the casing of the release valve assembly 47, it being observed that this plunger and the similar plunger 56 are disposed at opposite sides of the roller 44 carried by the movable post 42. The valve chamber 60 communicates by way of a pipe 67 with the passage 52 of the supply valve assembly, and also communicates with the piston chamber 32 by way of a pipe 68 and a restricted passage 69 formed in the cylinder head 33.

Directly above the supply valve assembly 46 there is secured to the housing 20 a control cylinder 71, which has operatively mounted therein a piston 72 having formed at the upper side thereof a piston chamber 73 that communicates with the control pipe 13 previously mentioned. A coil spring 74 is preferably interposed between the lower end wall of the cylinder 71 and the piston 72 for biasing that element upwardly. The piston has a stem 75 which is vertically aligned with the plunger 56 and extends outwardly of the cylinder 71 as shown in the drawing.

According to the invention, a movable beam 80 is provided for controlling operation of the valve elements 51 and 61. The beam end thereof is pivotally connected by means of a pin 81 to the lowermost portion of the piston stem 75, while the central portion of the beam is fulcrumed on the roller 44 carried by the post 42 and piston stem 29. The end of the movable beam 80 opposite that carrying the pin 81 projects into operative alignment with the plunger 66 and is subject to the downward force of a coil spring 83, which is interposed between an upper wall of the housing 20 and a movable member 84 carrying a roller 85 that is adapted to engage the beam. Suitable guide elements 86 are preferably secured to the housing at opposite sides of the movable member 84 for preventing lateral displacement thereof during operation of the mechanism. It will be understood that the spring 83 is thus arranged to act through the medium of the movable beam 80 to oppose downward movement of the piston 72 by the pressure of fluid supplied to the chamber 73. The beam 80 is of course adapted to be tilted about the roller 44 for actuating either of the plungers 66 and 56, in accordance with the selected operation of the apparatus.

*Operation*

Operation of the single brake and propulsion actuator device as shown in Fig. 2 will now be described in detail, it being understood that all of the actuator devices 10 on the separate vehicles of the train illustrated in Fig. 1 are effected simultaneously and in the same manner, in accordance with manipulation of the control valve device 15 on the leading vehicle. When the brake and propulsion control system is initially charged, fluid under pressure is supplied from the reservoir 12, shown in Fig. 1, to the supply pipe 11, and by way of the control valve device 15 on the leading vehicle to the control pipe 13, the fluid pressure in the latter pipe being normally maintained at a predetermined value as already explained.

When the pressure of fluid in the chamber 73 of the actuator device 10 is thus initially increased to the normal value by flow of fluid thereto from the control pipe 13, the piston 72 is moved downwardly against the force of the spring 74, and thereby acts through the medium of the stem 75 and pin 81 to tilt the beam 80 in a clockwise direction about the roller 44, which it will be understood is initially disposed in its innermost position, this being the position in which that element together with the piston rod 29 and piston 28 are maintained by the spring 31 while the chamber 32 remains uncharged. Upon downward movement of the piston rod 75 by the piston 72, however, the adjacent end of the beam 80 is carried downwardly into engagement with the plunger 56, which is thereby actuated to effect unseating of the valve element 51 against the force of the spring 54. Fluid under pressure is then quickly supplied from the supply pipe 11 past the unseated valve element 51 and through the chamber and passage 52, pipe 67, valve chamber 60, pipe 68, and passage 69 to the piston chamber 32, where the pressure of fluid becomes effective to shift the piston 28 to the right, as viewed in Fig. 2. When the piston 28 and piston rod 29 have thus been moved against the force of the spring 31 into the coasting position as illustrated, the roller 44 is so positioned with respect to the movable beam 80 as to provide sufficient leverage to render the spring 83 effective to tilt the beam into a substantially horizontal position, it being understood that the several operaing elements of the actuator mechanism 10 are in practice proportioned and adjusted to assume the coasting position so long as the pressure of fluid in the control pipe 13 and piston chamber 73 is maintained at the normal predetermined value. When the beam 80 is moved to the coasting position, the supply valve element 51 is of course lifted into engagement with its seat for cutting off further supply of fluid under pressure to the piston chamber 32.

With the piston rod 29 thus maintained in coasting position, the rack portion 35 thereof is disposed between the two pinions 36 and 37, it being understood that the brake controller 23 is at this time held in brake releasing position, while the propulsion controller 21 is disposed in its inoperative position for cutting off the supply of power to the propulsion motors of the vehicle.

In order to effect operation of the driving motors for the purpose of propelling the vehicle, the operator manipulates the control valve device 15 so as to cause an increase in pressure of fluid in the control pipe 13 above the normal pressure. Upon the consequent increase in the pressure of fluid in the piston chamber 73 of the actuator mechanism 10, the piston 72 is moved downwardly from its intermediate or coasting position and through the medium of the piston stem 75 tilts the beam 80 in a clockwise direction about the roller 44, while at the same time overcoming the opposing force exerted by the spring 83 at the opposite end of the beam. When the end of the beam 80 carrying the pin 81 is thus moved downwardly, the lower surface thereof is brought into engagement with the plunger 56 for unseating the supply valve 51, whereupon fluid under pressure is supplied, through the communications already pointed out, to the piston chamber 32 for shifting the piston 28 and the piston stem 29 out of the coasting position, thereby bringing the rack portion 35 into operative engagement with the pinion 37 for effecting operation of the propulsion controller 21, it being understood that the usual rotary switch elements included in the propulsion controller are thereby actuated to complete suitable circuits, not shown, for effecting operation of the propulsion motors in the usual manner.

The rate of operation of the vehicle propulsion motors is of course determined by the angle through which the propulsion controller 21 is turned, and consequently in accordance with the distance traversed by the piston 28 and associated elements of the actuator mechanism, the movement of which is in turn controlled to correspond to the degree of increase in the pressure of fluid in the control pipe 13 above the normal pressure previously mentioned. When the piston 28, piston rod 29 and roller 44 carried thereby has been shifted to a position corresponding to the selected pressure of fluid in the control pipe 13, the spring 83 is again rendered effective to balance the downward force exerted by the piston 72, whereupon the beam 80 is rotated in a counterclockwise direction about the roller 44 for permitting the valve spring 54 to move the valve element 51 into seated position as shown in Fig. 2. When the supply of fluid under pressure to the piston chamber 32 is thus cut off, further movement of the piston 28 and elements associated therewith is prevented.

It should be understood that all of the actuator mechanisms 10 on the vehicles of the train shown in Fig. 1 are adapted to respond in exactly the same manner to the increase in control pipe pressure as just explained, so that the propulsion motors throughout the train are operated at a substantially uniform rate according to the will of the motorman operating the control valve device 15 on the leading vehicle. It will be further evident that the speed of the train may be increased or decreased as desired by controlling the pressure of fluid in the control pipe 13 through the medium of control valve device, each of the several actuator mechanism 10 being adapted to respond quickly, as already explained, to each variation in control pipe pressure for effecting corresponding operation of the propulsion motors.

When it is desired to cut off the supply of power to the vehicle motors, the pressure of fluid in the control pipe 13 is again restored to the normal value by operation of the motorman's control valve device. Upon the resultant upward movement of the control piston 72 by the spring 74, in response to the reduction in control pipe pressure in the chamber 73, the spring 83 is rendered effective to tilt the beam 80 in a counterclockwise direction about the roller 44 until the free end of the beam is brought into operative engagement with the plunger 66 for unseating the release valve element 61 against the force of the spring 62. With the release valve 61 unseated, fluid under pressure is vented from the piston chamber 32 by way of the restricted passage 69, pipe 68, valve chamber 60, and port 65, and the spring 31 is thus rendered effective to shift the piston 28 and rod 29 toward coasting position.

As the rack portion 35 of the piston stem 29 is thus returned to its coasting position, it effects operation of the propulsion controller 21 through the medium of the gear pinion 37 and gear 39, for thereby moving the usual switch mechanism of the controller to power-off position. When the roller 44 has been carried to the coasting position, the control pipe pressure acting on the piston 72 is again balanced with the force of the spring 83 through the medium of the beam 80, and the latter element is consequently returned to its horizontal position for permitting the release valve element 61 to be moved into seated position by the spring 62, thus stopping movement of the piston 28 in its illustrated position.

When it is desired to effect an application of the brakes, the control valve device on the leading vehicle is operated in the usual manner to effect reduction of pressure of fluid in the control pipe 13 from the normal value to a value corresponding to the desired degree of brake application desired. Upon the consequent reduction in force of control pipe pressure acting downwardly through the medium of the piston 72 and stem 75 on the beam 80, the spring 83 moved the member 85 and roller 84 downwardly so as to tilt the beam 80 about the roller 44 in a counterclockwise direction, the adjacent end of the beam being at the same time brought into operative engagement with the stem 66 for unseating the release valve element 61. Fluid under pressure is thereby vented from the piston chamber 32 in the manner hereinbefore explained, so that the spring 31 is rendered effective to shift the piston 28 and piston rod 29 to the left as viewed in Fig. 2. In so moving the piston rod 29 carries the rack portion 35 into operative engagement with the pinion 36 for effecting operation of the brake controller 23 to initiate the desired application of the brakes. After the roller 44 carried by the piston rod 29 has been moved far enough to the left, as viewed in the drawing, to effect substantial balancing of the opposing forces of control pipe pressure and spring pressure acting on opposite ends of the beam 80, the latter member is again tilted into its horizontal position for permitting movement of the valve element 61 to seated position for cutting off further discharge of fluid under pressure from the piston chamber 32. The piston 28 and associated movable elements of the actuator mechanism are thus held in the position assumed in response to the selected degree of reduction in control pipe pressure.

It will be understood that, as hereinbefore explained in connection with operation of the actuator mechanism in controlling the proportion motors, each of the actuator mechanisms in the train is adapted to effect application of the associated brakes with substantially the same degree of force, and simultaneously with operation of the other actuator mechanism throughout the train. It will further be apparent that the motorman can graduate the application of the brakes as desired by varying the pressure of fluid in the control pipe, thereby effecting corresponding movement of each of the brake and propulsion control actuator mechanisms in the manner just explained.

From the foregoing description it will be apparent that an actuator device constructed in accordance with my invention may be employed in a brake and propulsion control system of the fluid pressure operated type and is operative to effect definite mechanical movement of either the associated brake controller or the propulsion controller as predetermined in accordance with variations in pressure of fluid in a control pipe.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake and propulsion control actuator mechanism for a vehicle, comprising, movable abutment means subject to pressure of fluid in a chamber, a spring for biasing said abutment means in opposition to said fluid pressure, means operable on movement of said abutment means in one direction for controlling the propulsion of the vehicle and on movement thereof in another direction for effecting application of the brakes, valve means controlling the supply and release of fluid under pressure to and from said chamber, and means subject to a variable control pressure for actuating said valve means and including a movable beam, and a fulcrum therefor positioned by said movable abutment.

2. A brake and propulsion control actuator mechanism for a vehicle, comprising, movable abutment means subject to pressure of fluid in a chamber and constructed and arranged for movement from a normal position either in one direction for controlling the propulsion of the vehicle or in another direction for effecting application of the brakes, a movable fulcrum element adapted to be positioned according to movement of said abutment means, supply and release valve means controlling the pressure of fluid in said chamber, a beam rockably supported on said fulcrum element and adapted to control said valve means, a biasing spring cooperative with one end of said beam, and fluid pressure operable means cooperative with the other end of said beam, said fluid pressure operable means being arranged for directing the ultimate positioning of said movable abutment means.

3. A brake and propulsion control actuator mechanism for a vehicle, comprising, movable abutment means subject to pressure of fluid in a chamber and constructed and arranged for movement from a normal position either in one direction for controlling the propulsion of the vehicle or in another direction for effecting application of the brakes, a movable fulcrum element adapted to be positioned according to movement of said abutment means, supply and release valve means controlling the pressure of fluid in said chamber, a beam rockably supported on said fulcrum element and adapted to control said valve means, a biasing spring arranged to exert a force on said beam at one side of said fulcrum element, and fluid pressure operated means arranged to exert an opposing force on said beam at the other side of said fulcrum element, whereby variations in a control fluid pressure acting on said fluid pressure operated means will be effective to govern the positioning of said movable abutment means.

4. In a brake and propulsion control equipment for a vehicle, in combination, an actuator member constructed and arranged for movement from a normal position either in one direction for controlling the propulsion of the vehicle or in another direction for controlling operation of the vehicle brakes, a piston subject to pressure of fluid in a chamber for operating said actuator member, supply valve means for said chamber, release valve means therefor, a tiltable beam having its ends operatively aligned with said two valve means, respectively, means subject to a variable control pressure for loading one end of said beam, spring means exerting a relatively constant biasing force on the other end of said beam, and a movable fulcrum element for varying the leverage ratio of said beam according to operation of said actuator member.

5. A brake and propulsion control actuator mechanism for a vehicle having a brake controller and a propulsion controller, comprising a movable abutment subject to pressure of fluid in a chamber, a spring, actuator means having a coasting position and movable in one direction by a preponderant force of said spring to operate said brake controller and movable in another direction by a preponderant fluid pressure acting on said movable abutment for operating said propulsion controller, valve means controlling the increase and reduction of fluid pressure in said chamber, fluid pressure operated means responsive to a variable control pressure, a beam element constructed and arranged to operate said valve means in response to operation of said fluid pressure operated means, and a movable fulcrum element carried by said actuator means and cooperative with said beam element to effect lapping of said valve means when said actuator means is in a position corresponding to said variable control pressure.

JOSEPH C. McCUNE.